United States Patent [19]

Giromella

[11] Patent Number: 5,205,565
[45] Date of Patent: Apr. 27, 1993

[54] SEALING ASSEMBLY TO BE INTERPOSED BETWEEN TWO MEMBERS IN RELATIVE MOTION

[75] Inventor: Giovanni Giromella, Marina Di Carrara, Italy

[73] Assignee: SKF Industrie S.p.A., Turin, Italy

[21] Appl. No.: 750,035

[22] Filed: Aug. 8, 1991

[30] Foreign Application Priority Data

Aug. 28, 1990 [IT] Italy ............................... 53212/90[U]

[51] Int. Cl.[5] ............................................. F16J 15/32
[52] U.S. Cl. ......................................... 277/11; 277/50; 277/181; 384/484; 29/451; 29/DIG. 3
[58] Field of Search ................... 277/9, 11, 50, 52, 94, 277/181, 182, 183, 184, 186; 324/147, 148, 477, 484, 485, 486; 29/451, DIG. 3, DIG. 29

[56] References Cited

U.S. PATENT DOCUMENTS

| | | | |
|---|---|---|---|
| 3,003,835 | 10/1961 | Schindel | 277/94 |
| 3,241,846 | 3/1966 | Peickii | 384/484 X |
| 3,382,567 | 5/1968 | Schaeffler | 277/184 |
| 3,989,259 | 11/1976 | Lorenz et al. | 277/182 X |
| 4,111,441 | 9/1978 | Sick et al. | 277/183 |
| 4,765,761 | 8/1988 | Umezaki | 384/484 |

FOREIGN PATENT DOCUMENTS

| | | | |
|---|---|---|---|
| 0208880 | 1/1987 | European Pat. Off. | 384/477 |
| 0764255 | 4/1951 | Fed. Rep. of Germany | 384/484 |
| 0581232 | 10/1946 | United Kingdom | 384/477 |
| 0803142 | 10/1958 | United Kingdom | 49/491 |

Primary Examiner—William A. Cuchlinski, Jr.
Assistant Examiner—James K. Folker
Attorney, Agent, or Firm—Ladas & Parry

[57] ABSTRACT

A sealing assembly is described, of the type in which a substantially rigid screen adapted to couple with a respective housing seat for the assembly itself on a member to be protected fixedly supports a sealing member of elastomeric material; the screen is made in a plastically deformable material and an outer peripheral portion of the screen, which with the sealing assembly not in use is inclined obliquely in the direction of introduction of the sealing assembly into the seat, is connected to the remainder of the screen through a stamped embossment shaped in such a way as to be able to act as a plastic hinge adapted to allow a rotation of the outer peripheral portion of the screen in a direction opposite that in which the sealing assembly is introduced into the seat during a mounting phase.

3 Claims, 1 Drawing Sheet

SEALING ASSEMBLY TO BE INTERPOSED BETWEEN TWO MEMBERS IN RELATIVE MOTION

BACKGROUND OF THE INVENTION

The present invention relates to a sealing assembly of the sealed screen type which can be used alone or in combination with an additional centrifuging screen to protect the rolling bodies of rolling element bearings. It is known to interpose between the outer and inner rings of a rolling element bearing (and, more generally, between two members of any type in relative motion) seals and/or sealing assemblies the function of which is to seal the annular cavity delimited between the rings in relative motion, in such a way as to impede the ingress of external contaminants to and the escape of lubricants from the said cavity which houses rolling bodies which render the rings mutually rotatable with low friction.

In one known type of sealing assembly a rigid screen is mounted on the outer ring of the bearing by means of a terminal edge facing away from the direction in which the sealing assembly is introduced into the associated housing seat; during assembly this terminal edge is curled over in such a way as to be upset in the seating and consequently lock the sealing assembly in it. Such a solution is not, however, free from disadvantages; in particular, the mechanical fixing is not very good and, above all, does not ensure a perfect seal; moreover, the assembly is complicated, there is the risk of deforming the sealing assembly during the upsetting phase, and the axial positioning of the sealing assembly is not always correct.

SUMMARY OF THE INVENTION

The object of the invention is that of providing a sealing assembly adapted to overcome these disadvantages.

The said object is achieved by the invention, which relates to a sealing assembly of the type adapted to be interposed between a first and a second member in relative motion to provide a fluid-tight closure for a cavity delimited between the said members, the sealing assembly comprising a substantially rigid screen adapted to couple with a respective housing seat formed on the said first member, and a sealing element made of elastomeric material and carried fixedly by the said screen, adapted to cooperate with the said second member to form a fluid-tight seal; characterised by the fact that the said screen is made, at least in part, of a plastically deformable material, and by the fact that a peripheral portion of the screen, which is adapted to couple with the said seat and which, before mounting of the sealing assembly in the seat is disposed inclined obliquely to the side of the sealing assembly which is introduced into the seat, is connected to the remainder of the screen through a plastic hinge adapted, upon mounting of the sealing assembly into the seat, to cause rotation of the peripheral portion of the screen to the opposite side of the sealing assembly from that which is introduced into the seat. Other objects, features, and advantages of the invention will be apparent from the following detailed description of a preferred embodiment, with reference to the accompanying drawings.

DETAILED DESCRIPTION OF THE PREFERRED EMBODIMENT

Figure 2:
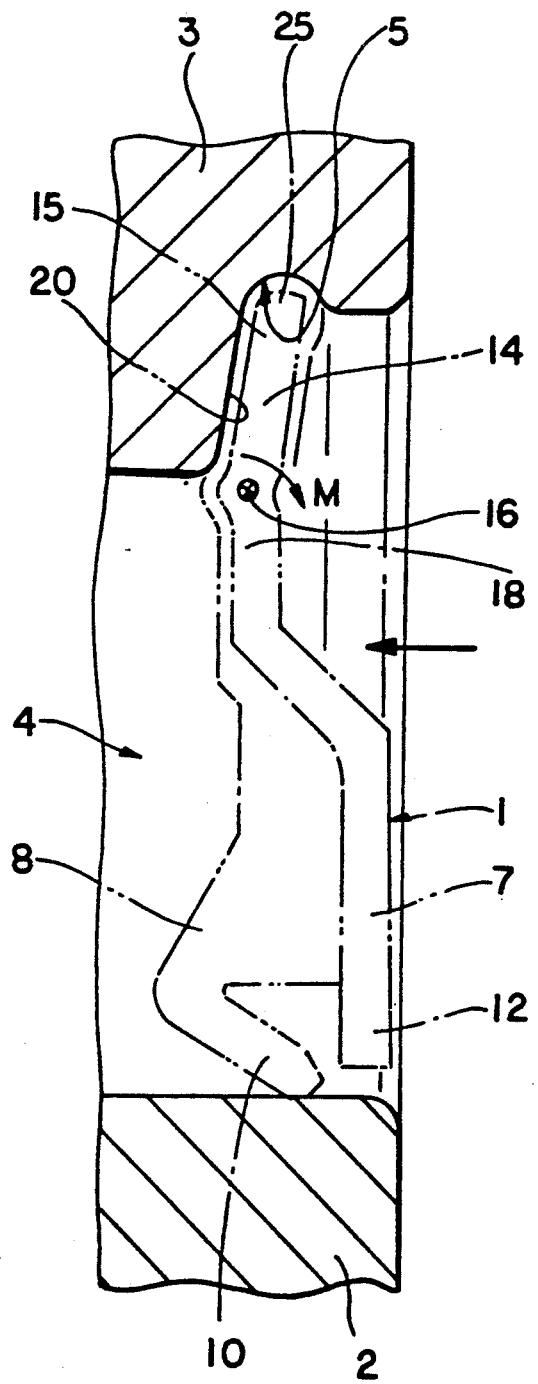
FIG. 2 is a side view of the sealing assembly, shown in a broken lines, mounted between a pair of rings.
Figure 1:
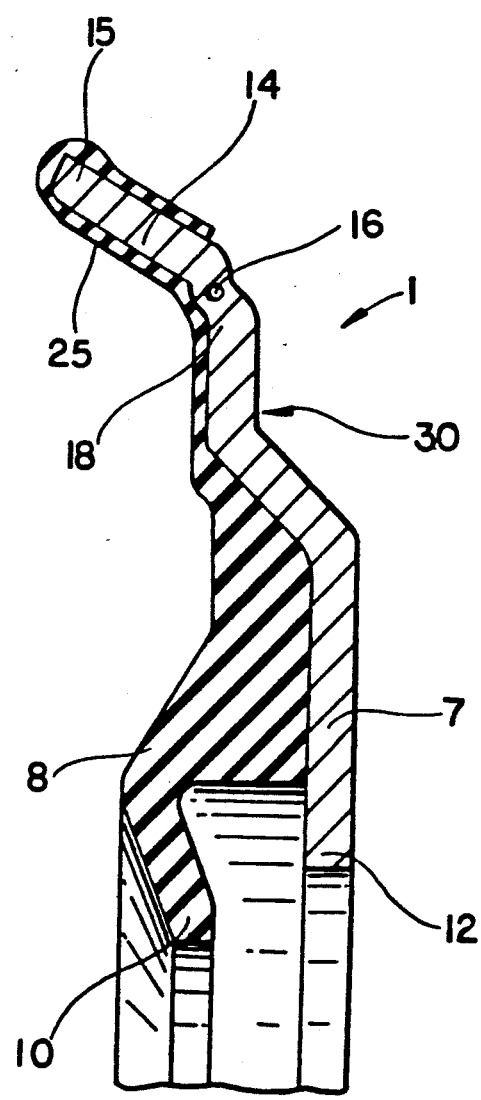
FIG. 1 is a side view of a sealing assembly.

With reference to FIGS. 1 and 2, the reference numeral 1 generally indicates a sealing assembly of the type adapted to be interposed between two members in relative motion, in the specific example an inner ring 2 and an outer ring 3 of a known rolling element bearing, to close in a fluid-tight manner a cavity 4 delimited between the rings 2, 3 and in which are housed the rolling bodies of the said bearing and the associated rolling tracks which are known and therefore not illustrated for simplicity. The sealing assembly 1, which impedes both the escape from the cavity 4 of the lubricating grease for the said rolling bodies and the accidental ingress into the cavity itself of external contaminants such as moisture and dust, which could damage the rolling bodies and the associated rolling tracks, is mounted fixedly on the ring 3 within an annular seat 5, and cooperates in a fluid-tight manner with the inner ring 2; in particular, the sealing assembly 1 comprises a substantially rigid annular screen 7 adapted to engage with the seat 5 and an annular sealing element 8 made of an elastomeric material, for example rubber; the element 8 is carried securely by the screen 7, which is preferably made of a sheet metal pressing and is adapted to cooperate in a fluid-tight manner with the inner ring 2; for this purpose the elastomeric element 8, which is coaxial with the screen 7, is provided, for example, with a sliding lip seal 10 shaped in such a way as to cooperate slidingly, in use, with a predetermined pressure against the outer lateral surface of the ring 2; in the non-limitative specific example illustrated, a further sealing action, in particular a labyrinth seal is also formed by a radially inwardly directed edge 12 of the rigid screen 7, which is left free by the elastomeric element 8.

According to the invention the screen 7 comprises a radially outer peripheral annular portion 14 adapted to couple, in use, with the seat 5 by means of its outer terminal edge 15. This portion 14, which before mounting of the seal 1 into the seat 5 (the shape illustrated in solid outline in FIG. 1 is disposed inclined obliquely on the introduction side of the sealing assembly into the seat 5 (the direction and sense of introduction are indicated in FIG. 2 by an arrow) is connected to the remainder of the screen 7 through a plastic hinge 16 adapted, upon mounting of the sealing assembly 1 into the seat 5, to cause a rotation of the peripheral portion 14 towards the side opposite the side of the sealing assembly 1 which is introduced into the seat 5 until it assumes the position illustrated in broken outline in FIG. 2, in which the portion 14 is located in a turned position, even if with greater inclination (with respect to the axis of symmetry of the annular screen 7) with respect to the starting position. This plastic hinge 16 is obtained by making the screen 7, at least at the base of the peripheral portion 14, of a plastically deformable material: in practice the screen 7 is made by pressing a metal sheet and the plastic hinge 16 is defined by an annular stamped embossment 18 the convexity of which faces the introduction side of the seal 1 by which the seal is introduced into the seat 5.

The sealing assembly 1 according to the invention is essentially made in the factory and, consequently, sold to the user in the shape illustrated in solid outline, that is with the inclined portion 14 orientated forwardly through about 45° in such a way as to define on the introduction side of the sealing assembly 1 into the seat 5 a frusto-conical bell; upon mounting the sealing assembly 1 is pressed, for example with a press tool, into the seat 5 in the direction of the arrow: during the introduction motion the edge 15 is in contact with a shoulder 20 of the seat 5 and consequently, by reaction, a moment M is applied to the hinge 16, which causes plastic deformation of the screen 7 such that the portion 14 becomes turned rearwardly: this passes the plane passing through the hinge 16 and stabilises in the position illustrated in broken outline, in which it forms a cone having a cone angle greater than and in the opposite direction from that in which it started; this second shape is then maintained by the sealing assembly 1 during the whole of its working life.

According to a further characteristic of the invention, on the introduction side of the sealing assembly 1 into the seat 5 the screen 7 is entirely covered by the elastomeric element 8; this, in fact, extends even over the peripheral portion 14 so as to entirely cover the edge 15 with a terminal projection 25 which, in use, remains consequently interposed between the terminal edge 15 of the peripheral portion 14 and the seat 5; in particular, before mounting and consequent deformation of the plastic hinge 16 the edge 15 (shaped as in the solid outline) is disposed, because of the angle of inclination of the portion 14, on a smaller diameter than the internal diameter of the seat 5. However, after deformation of the hinge 16 (to the broken outline shape) the edge 15 is disposed on a greater diameter than before (because of the different inclination of the portion 14 in this deformed configuration) and substantially equal to the internal diameter of the seat 15 so that it is installed, with the interposition of the projection 25 which covers it, into the seat 5 itself. In this way both a correct and unalterable stable mechanical connection between the ring 3 and the screen 7 is ensured, as well as a perfect sealing action of the sealing assembly 1 at this connection. For the purpose of ensuring correct deformation of the screen 7 during the mounting stage this is provided, on the side opposite the introduction side of the sealing assembly into the seat 5, with a shoulder surface 30 disposed, with respect to the said plastic hinge 16, on the side opposite the peripheral portion 14, that is in correspondence with the base thereof. It is on this shoulder surface 30 which, during mounting, the press tool or other suitable tool acts in such a way as not to interfere with the rotation of the portion 14.

From what has been described the advantages associated with the sealing assembly formed according to the invention will be apparent: the necessity for upsetting the part of the rigid screen into the seat in which it is housed whereby to ensure mounting of the screen on the ring of the bearing is eliminated: in this way mounting is simpler and more rapid, being effected simply by applying an axial thrust to the sealing assembly. The risks of unwanted deformation of the sealing assembly and/or of the outer ring of the bearing during mounting are moreover reduced. The mechanical locking and the coupling seal between the rigid screen and the seat on the bearing are greatly improved even in the presence of slight dimensional defects of the screen. Finally, a greater axial positioning precision of the screen can be obtained and, therefore, an easier coupling with a possible known centrifuging screen to form a twin element sealing assembly.

I claim:

1. A sealing assembly to be interposed between a first and a second member, which are movable relatively to each other, so as to form a fluid tight seal for a cavity delimited between said members, the sealing assembly comprising:

a substantially rigid annular screen at least partially made of a plastically deformable material, said screen having an shoulder portion to cooperate in a fluid tight manner with said second member and said screen having a peripheral portion designed to be coupled with a housing seat formed on said first member, said screen further including a plastic hinge for said peripheral portion of the screen, said plastic hinge being defined by a stamped embossment provided on said screen and said embossment having a convexity facing, when in use, towards a side of the cavity into which said sealing assembly is to be introduced into said cavity so that said plastic hinge allows said peripheral portion of the screen to selectively assume a first undeformed position in which the peripheral portion is inclined forwardly towards said side and forms, with an axis of symmetry of said sealing assembly, a first angle, and when the sealing assembly is mounted between said members, said peripheral portion is moved to a second deformed position in which the peripheral portion is inclined backwardly away from said side and forms, with said axis of symmetry of the sealing assembly, a second angle that greater than and opposite to said first angle; and a sealing element made of elastomeric material and carried fixedly by said screen.

2. A sealing assembly as claimed in claim 1, wherein in use said sealing element extends from the screen towards said side of the cavity, said sealing element having a terminal projection which covers a terminal edge of said peripheral portion so that in use the terminal projection is interposed between said terminal edge of the peripheral portion of the screen and said housing seat.

3. A sealing assembly as claimed in claim 1, wherein said shoulder portion being provided substantially in correspondence with a base portion of said peripheral portion of the screen, and being disposed, with respect to said plastic hinge, in a position opposite to that of said peripheral portion.

* * * * *